United States Patent [19]

Ueda et al.

[11] Patent Number: 4,644,042
[45] Date of Patent: Feb. 17, 1987

[54] POLYMERS OF N-SUBSTITUTED SECONDARY MONOALLYLAMINES AND THEIR SALTS AND PROCESS FOR PRODUCING THE SAME

[75] Inventors: Toshio Ueda; Kenji Kageno; Kiyoshi Shimizu, all of Koriyama; Sakuro Hasegawa, Fujisawa; Susumu Harada, Tokyo, all of Japan

[73] Assignee: Nitto Boseki Co., Ltd., Fukushima, Japan

[21] Appl. No.: 770,297

[22] Filed: Aug. 27, 1985

[30] Foreign Application Priority Data

Sep. 1, 1984 [JP] Japan .................................. 59-183602

[51] Int. Cl.$^4$ ......................... C08F 2/00; C08F 12/28; C08F 26/04; C08F 4/04
[52] U.S. Cl. .................................... 526/204; 526/218; 526/219; 526/234; 526/237; 526/310; 526/233; 526/213
[58] Field of Search ..................... 526/277, 310, 218.1, 526/219, 213, 234, 237, 204

[56] References Cited

U.S. PATENT DOCUMENTS

| | | | |
|---|---|---|---|
| 4,329,441 | 5/1982 | Bergthaller | 526/310 |
| 4,504,640 | 3/1985 | Harada et al. | 526/218.1 |
| 4,528,347 | 7/1985 | Harada et al. | 526/218.1 |
| 4,540,760 | 9/1985 | Harada et al. | 526/218.1 |

FOREIGN PATENT DOCUMENTS 1122256 1/1962 Fed. Rep. of Germany .
0095233 11/1983 United Kingdom .

Primary Examiner—Joseph L. Schofer
Assistant Examiner—Peter F. Kulkosky
Attorney, Agent, or Firm—Bert J. Lewen; Henry Sternberg

[57] ABSTRACT

N-substituted secondary monoallylamine salts can be easily polymerized in a polar solvent by using as catalyst a water-soluble radical initiator containing azo group in the molecule, and polymers with a high degree of polymerization can be obtained therefrom in a high yield.

6 Claims, 8 Drawing Figures

POLYMERS OF N-SUBSTITUTED SECONDARY MONOALLYLAMINES AND THEIR SALTS AND PROCESS FOR PRODUCING THE SAME

TECHNICAL FIELD

This invention relates to the polymers of N-substituted secondary monoallylamines and their salts, and a process for producing such polymers.

BACKGROUND ART

As is well known, allyl compounds are hard to polymerize with a conventional radical initiator, and generally there can be produced only the polymers of low degree of polymerization in a low yield. This is considered due to a self-terminating reaction that takes place in the course of the reaction between the allyl hydrogen atoms and the radical, and such self-terminating reaction is usually referred to as allylic degradative chain transfer.

This fact is now a common knowledge to the polymer chemists and has been reviewed in many literatures and books (see, for example, C. E. Schildknecht: Allyl Compounds and Their Polymers, Wiley-Interscience, 1973, pp. 29–30, and R. C. Laible: Chem. Rev., 58 (5), pp. 807–843 (1958)).

The same holds true with N-substituted secondary monoallylamine derivatives which are a kind of allyl compounds, and no successful high-yield polymerization of N-substituted secondary monoallylamine derivatives with a conventional radical or ionic initiator has ever been reported, nor are known polymers of N-substituted secondary monoallylamines or their salts, excepting those of N-methylallylamine.

Thus, the commercial production of polymers of N-substituted secondary monoallylamine derivatives has been considered very difficult. However, since the N-substituted secondary monoallylamine derivatives themselves can be easily produced from primary amines and allyl halide both of which are available at low cost, the discovery of their polymerization method would enable inexpensively supply of the polymers of N-substituted secondary monoallylamines which are of great industrial utility. The development of such polymerization method with high efficiency has therefore been strongly desired.

DISCLOSURE OF INVENTION

In view of such circumstances, the present inventors have made researches for a method capable of producing the polymers of N-substituted secondary monoallylamine salts by carrying out a radical polymerization thereof under the industrially applicable conditions with no technical difficulties, and as a result, found out the fact that N-substituted secondary monoallylamine salts can be easily polymerized in a polar solvent when a water-soluble radical initiator containing azo group in the molecule is used as catalyst. The present invention was achieved based on such finding.

Thus, the present invention, in one aspect thereof, is intended to provide polymers of N-substituted secondary monoallylamines and their salts represented by the general formula:

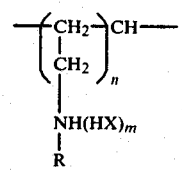

(wherein R represents a radical selected from the group consisting of alkyl having 2 or more carbon atoms, substituted alkyl and cycloalkyl radicals; X represents a monovalent anionic radical; n represents an integer from 10 to 100,000; and m represents an integer from 0 to 100,000).

In another aspect of this invention, it provides a process for producing polymers of N-substituted secondary monoallylamines represented by the general formula:

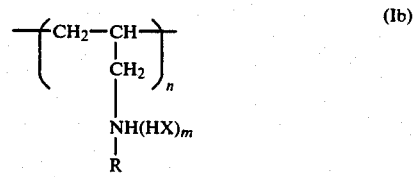

(wherein R represents a radical selected from the group consisting of alkyl having one or more carbon atoms, substituted alkyl and cycloalkyl radicals; X represents a monovalent anionic radical; n represents an integer from 10 to 100,000; and m represents an integer from 0 to 100,000) and their salts, which comprises polymerizing N-substituted secondary monoallylamine salts represented by the general formula:

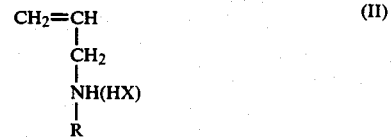

(wherein R represents a radical selected from the group consisting of alkyl having one or more carbon atoms, substituted alkyl and cycloalkyl radicals and X represents a monovalent anionic radical) in a polar solvent in the presence of a water-soluble radical initiator containing azo group in the molecule.

PREFERRED MODES FOR CARRYING OUT THE INVENTION

Figure 1:
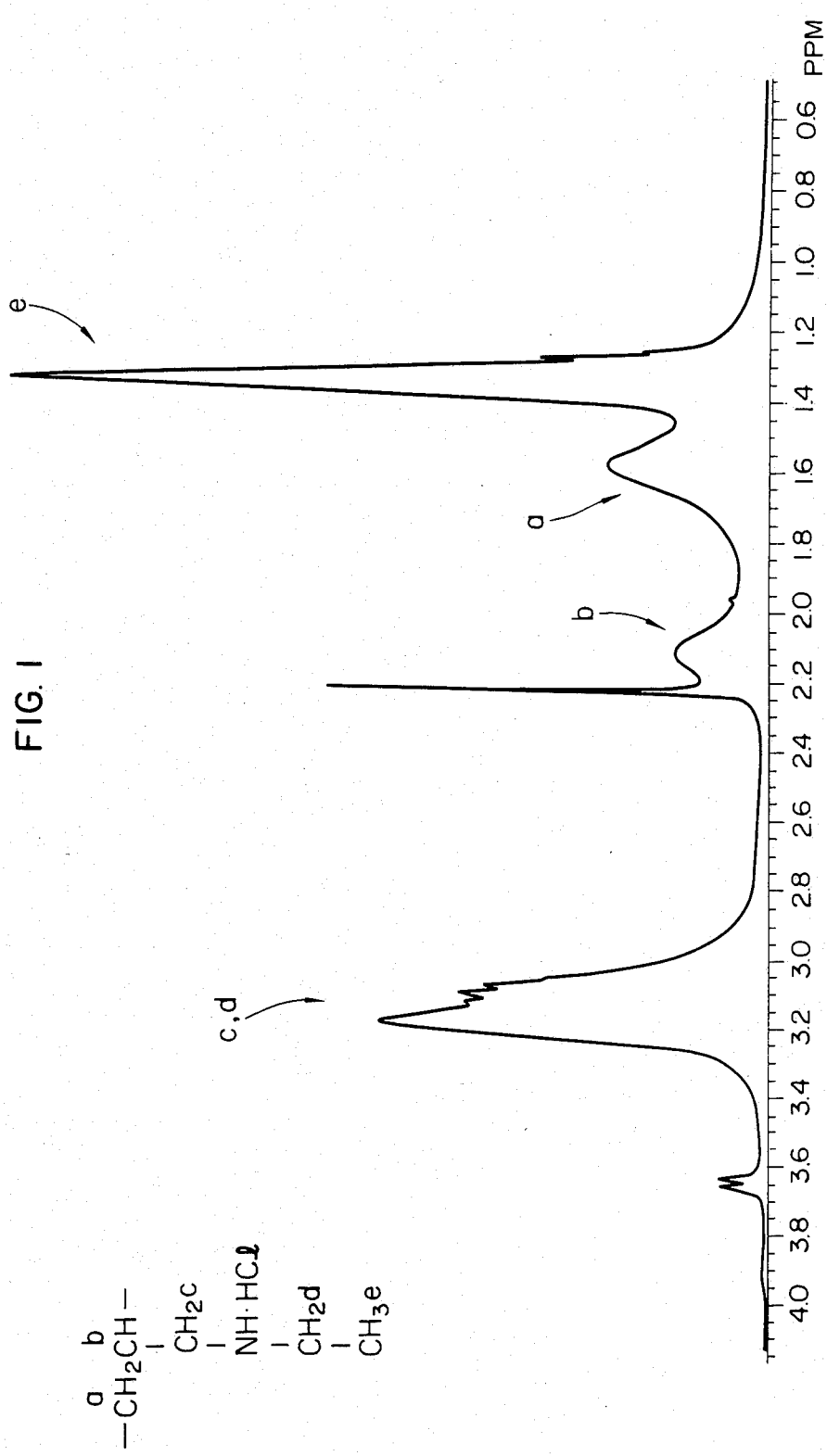
FIGS. 1 to 8 are $^1$H-NMR spectra of the polymers of N-substituted secondary monoallylamine hydrochlorides obtained from the process of this invention.

In the general formula (Ia):

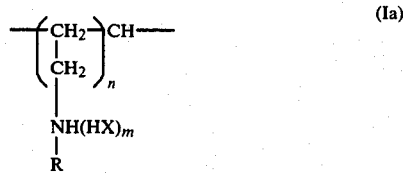

representing the polymers of N-substituted secondary monoallylamines and their salts according to this invention, R represents a radical selected from the group consisting of alkyl having 2 or more carbon atoms, substituted alkyl and cycloalkyl radicals. Preferred and typical examples of such radicals are ethyl, n-propyl, iso-propyl, n-butyl, sec-butyl, iso-butyl, tert-butyl, amyl, hexyl, octyl, cyclohexyl, benzyl, 2-hydroxyethyl, 2-hydroxypropyl, 2-aminoethyl, N,N-dimethylaminopropyl and tris(hydroxymethyl)methyl. X in the above formula (Ia) represents a monovalent anionic radical, the preferred and typical examples thereof being Cl, Br, I, $HSO_4$, $HSO_3$, $H_2PO_4$, $H_2PO_3$, HCOO, $CH_3COO$, and $C_2H_5COO$.

In the general formula (II):

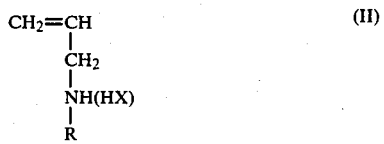

representing the N-substituted secondary monoallylamine salts used as starting material in the process of producing polymers of N-substituted secondary monoallylamines and their salts in this invention, R represents a radical selected from the group consisting of alkyl having one or more carbon atoms, substituted alkyl and cycloalkyl radicals. It will be noted that R in formula (II) differs from R in formula (Ia) in that it includes methyl radicals. X in formula (II) is identical with that in formula (Ia) and the same examples as mentioned above with X in formula (Ia) can be cited as preferred and typical examples of X in formula (II).

Especially preferred examples of N-substituted secondary monoallylamine salts of formula (II) are the inorganic or organic acid salts of N-methylallylamine, N-ethylallylamine, N-n-propylallylamine, N-iso-propylallylamine, N-n-butylallylamine, N-sec-butylallylamine, N-tert-butylallylamine, N-iso-butylallylamine, N-amylallylamine, N-hexylallylamine, N-octylallylamine, N-cyclohexylallylamine, N-benzylallylamine, N-2-hydroxyethylallylamine, N-2-hydroxypropylallylamine, N-2-aminoethylallylamine, N-allyl-N,N-dimethyl-propanediamine, N-allylamino-tris(hydroxymethyl)methane and the like.

Polymers represented by the formula:

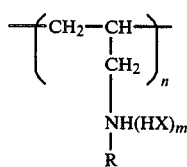

(wherein R and X are the same as defined with formula (II), and m and n are the same as defined with formula (Ia))
can be obtained by polymerizing N-substituted secondary monoallylamine salts of formula (II).

The polymerization is carried out in a polar solvent, for example, water, an inorganic acid or an aqueous solution thereof, an organic acid or an aqueous solution thereof, alcohol, dimethyl sulfoxide, dimethylformamide, formamide, or an aqueous solution of a salt of an inorganic acid (such as zinc chloride, calcium chloride and magnesium chloride).

In carrying out the polymerization, the N-substituted secondary monoallylamine salt is usually used in the form of isolated crystal. It is however possible to add an N-substituted secondary monoallylamine and an acid in said polar solvent to form a salt in the system (in situ). Needless to say, in case of using an acid or an aqueous solution thereof as polymerization medium, a determined amount of N-substituted secondary monoallylamine can be directly added into the acid or its aqueous solution for conducting the polymerization.

In the process for producing polymers of N-substituted secondary monoallylamines and salts thereof in accordance with this invention, a water-soluble radical initiator containing azo group in the molecule is used as catalyst. Preferred for use as such water-soluble radical initiator in this invention are the azo compounds represented by the following general formula:

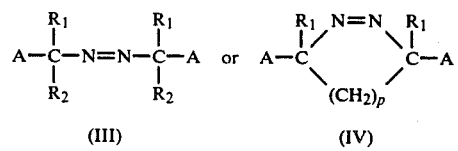

(wherein p is a number of 1 or 2; $R_1$ and $R_2$, which may be the same or different, represent hydrogen or a hydrocarbon having 1 to 10 carbon atoms or substituted hydrocarbon radical; $R_1$ and $R_2$ may be combined together to form a ring; and A represents

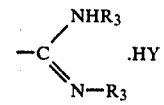

(where $R_3$ represents hydrogen or a hydrocarbon having 1 to 8 carbon atoms or substituted hydrocarbon radical, and HY represents an inorganic or organic salt),

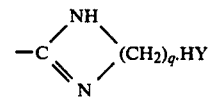

(where HY is as defined above, and q is a number of 2 to 3),

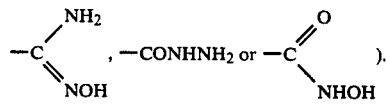

Especially preferred examples of the azo compounds represented by the above-shown formula (III) or (IV) are listed below.

(1) 2,2'-azobis(2-amidinopropane) dihydrochloride, 2,2'-azobis(2-amidinobutane) dihydrochloride, 2,2'-azobis(2-amidinopentane) dihydrochloride, 2,2'-azobis(2-amidinohexane) dihydrochloride, 2,2'-azobis(2-amidino-4-methyl-4-methoxypentane) dihydrochloride, 1,1'-azobis(1-amidinocyclohexane) dihydrochloride, 2,2'-azobis(2-amidino-3-methylbutane) dihydrochloride, 2,2'-azobis(2-amidino-3,3- dimethylbutane) dihydrochloride, 2,2'-azobis(2-amidino-4-methylpentane) dihydrochloride, 2,2'-azobis(2-amidino-4,4-dimethylpentane) dihydrochloride, 2,2'-azobis(2-amidino-3-phenylpropane) dihydrochloride;

(2) 2,2'-azobis(2-(N-phenylamidino)propane) dihydrochloride, 2,2'-azobis(2-(N-phenylamidino)butane) dihydrochloride, 2,2'-azobis(2-(N-methylamidino)propane) dihydrochloride, 2,2'-azobis(2-(N-ethylamidino)propane) dihydrochloride, 2,2'-azobis(2-(N-propylamidino)propane) dihydrochloride, 2,2'-azobis(2-(N-butylamidino)propane) dihydrochloride, 2,2'-azobis(2-(N-cyclohexylamidino)propane) dihydrochloride, 2,2'-azobis(2-(N-hydroxyethylamidino)propane) dihydrochloride, 2,2'-azobis(2-(N-dimethylaminopropylamidino)propane) tetrahydrochloride, 2,2'-azobis(2-(N,N-dimethylamidino)propane) dihydrochloride, 2,2'-azobis(2-(N,N-dimethylamidino)propane) dihydrochloride;

(3) 2,2'-azobis(2-(imidazolinyl)propane) dihydrochloride, 2,2'-azobis(2-(imidazolinyl)butane) dihydrochloride, 2,2'-azobis(2-(3,4,5,6-tetrahydropyrimidinyl)propane) dihydrochloride, 2,2'-azobis(2-(3,4,5,6-tetrahydropyrimidinyl)butane) dihydrochloride;

(4) 3,5-diamidinyl-1,2-diazo-1-cyclopentene dihydrochloride, 3-methyl-3,4-diamidinyl-1,2-diazo-1-cyclopentene dihydrochloride, 3-ethyl-3,5-diamidinyl-1,2-diazo-1-cyclopentene dihydrochloride, 3,5-dimethyl-3,5-diamidinyl-1,2-diazo-1-cyclopentene dihydrochloride, 3,6-diamidinyl-1,2-diazo-1-cyclohexene dihydrochloride, 3-phenyl-3,5-diamidinyl-1,2-diazo-1-cyclopentene dihydrochloride, 3,5-diphenyl-3,5-diamidinyl-1,2-diazo-1-cyclopentene dihydrochloride;

(5) 2,2'-azobis(2-methylpropionehydroxamic acid), 2,2'-azobis(2-ethylbutylhydroxamic acid), 2,2'-azobis(2-propylpentylhydroxamic acid), 2,2'-azobis(2-carboxymethyl propionehydroxamic acid), 2,2'-azobis(2-carboxyethylpropionehydroxamic acid);

(6) 2,2'-azobis(2-methylpropaneamidoxime), 2,2'-azobis(2-ethylbutaneamidoxime), 2,2'-azobis(2-propylpentaneamidoxime), 3,3'-azobis(3-acetamidoximebutyric acid), 4,4'-azobis(4-acetamidoximevaleric acid);

(7) 2,2'-azobis(2-methylpropionic acid hydrazide), 2,2'-azobis(2-ethylbutyric acid hydrazide), 2,2'-azobis(2-propylvaleric acid hydrazide).

Preparation processes of these azo compounds are shown in U.S. Pat. Nos. 2,599,299 and 2,599,300 and Japanese Patent Application No. 211511/83.

In the process of this invention, the radical initiator is used in an amount of 0.1 to 10% by weight, usually 1 to 7% by weight, based on the N-substituted secondary monoallylamine salt.

Polymerization temperature will be 30° to 100° C., usually 40° to 70° C., though variable depending on the chemical structure of the initiator used. Polymerization time is usually within 200 hours.

The higher the concentration of starting monomer within the range of its solubility, the more desirable, but usually starting monomer concentration is 10 to 85% by weight.

Polymers of N-substituted secondary monoallylamine salts can be produced in the manner described above, while polymers of N-substituted secondary monoallylamines (free bases) can be also easily produced from the polymers of salts by a known method. In the latter case, the polymer of salt is dissolved in water or a polar solvent and then added with a strong base such as sodium hydroxide or potassium hydroxide in an amount equivalent to the amine, followed by the removal of by-produced low-molecular salt (which is sodium chloride in the case of sodium hydroxide), or treated with a strongly basic anion exchange resin.

For further clarifying the present invention, it will be described more particularly below by way of the examples thereof, but it is to be understood that the scope of the invention is not limited by these examples.

EXAMPLE 1

52.1 g of 35% hydrochloric acid was added to 42.58 g (0.5 mol) of N-ethylallylamine under cooling to maintain the temperature below 20° C. to obtain a 64.2% aqueous solution of N-ethylallylamine hydrochloride (hereinafter abbreviated as EAA.HCl). This solution was heated to 60° C. and added with 1.82 g of 2,2'-azobis(2-amidinopropane) dihydrochloride (hereinafter referred to as initiator 1), this solution being maintained at the same temperature for 48 hours. The solution viscosity increased gradually and a colorless and transparent viscous solution was obtained. When this solution was added into a large quantity of acetone, a white polymer precipitate was formed. This precipitate was filtered out and dried at 50° C. under reduced pressure to obtain 51.6 g of white powder (conversion: 84.9%).

From the results of elemental analysis, infrared spectroscopic analysis and $^1$H-NMR analysis, this polymer was ascertained to be poly-(N-ethylallylamine hydrochloride).

$^1$H-NMR spectrum of this polymer (in heavy water, 300 MHz, TSP internal standard) is shown in FIG. 1.

Intrinsic viscosity of this polymer as measured in a 1/10 mol NaCl solution at 30° C. was 0.18.

EXAMPLE 2

52.1 g of 35% hydrochloric acid was added to 49.6 g (0.5 mol) of N-iso-propylallylamine under cooling to maintain the temperature below 20° C. to obtain a 66.7% aqueous solution of N-iso-propylallylamine hydrochloride (hereinafter abbreviated as iPAA.HCl). 1.36 g of initiator 1 was added to this solution to perform polymerization at 60° C. for 48 hours in the same way as in Example 1, followed by the same treatment as in Example 1 to obtain 63.0 g of white powder (conversion: 92.9%). This polymer was determined to be poly(N-iso-propylallylamine hydrochloride) from the results of elemental analysis, IR spectroscopic analysis and $^1$H-NMR analysis.

Figure 2:
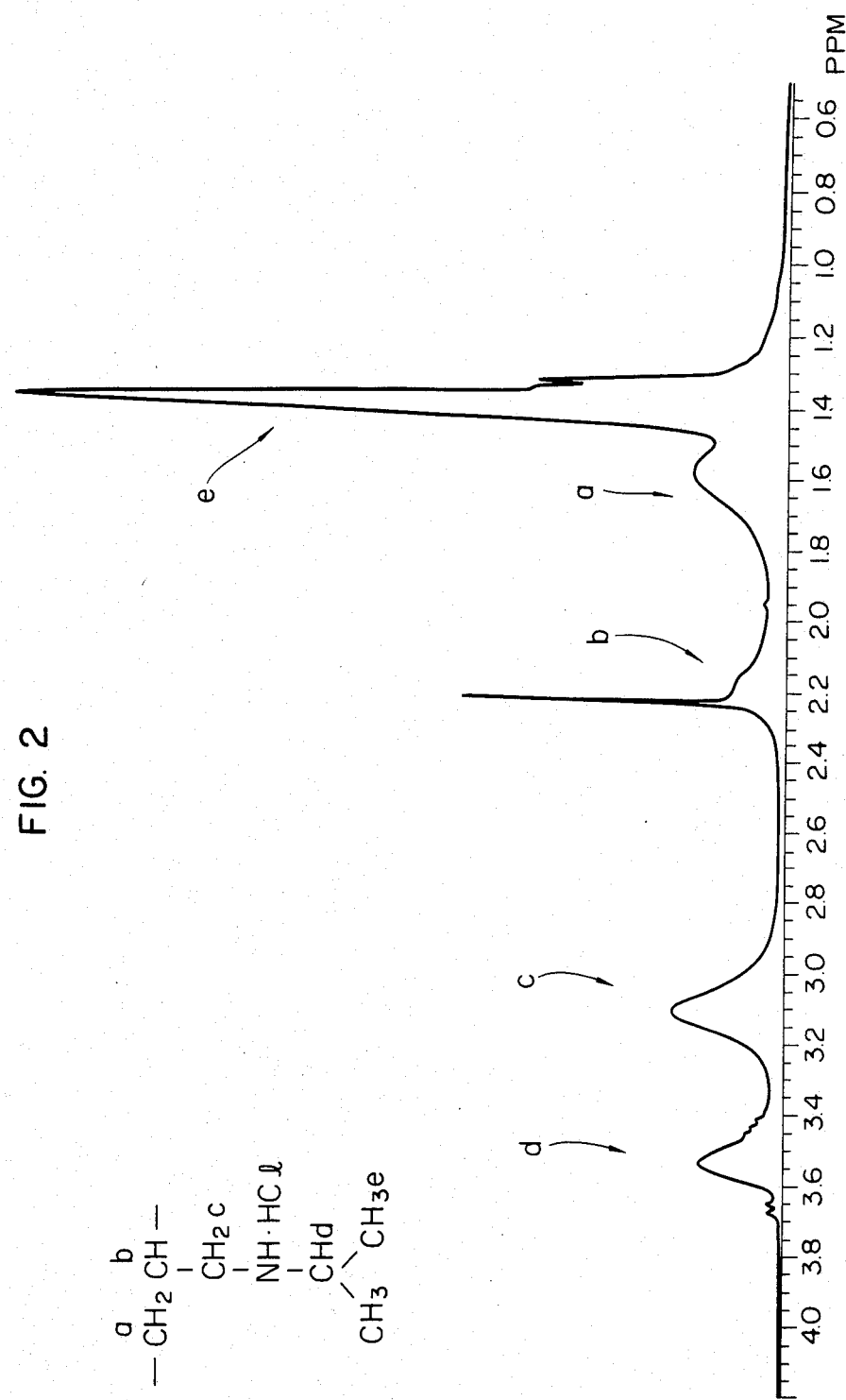

$^1$H-NMR spectrum of this polymer (in heavy water, 300 MHz, TSP internal standard) is shown in FIG. 2.

Intrinsic viscosity of this polymer as measured in 1/10 mol NaCl solution at 30° C. was 0.22.

EXAMPLE 3

52.1 g of 35% hydrochloric acid and 13.4 g of water were added to 69.6 g (0.5 mol) of N-cyclohexylallylamine under cooling to maintain the temperature below 20° C. to obtain a 65.0% aqueous solution of N-cyclohexylallylamine hydrochloride (hereinafter abbreviated as CHAA.HCl). This solution was added with 2.64 g of initiator 1 and polymerized at 60° C. for 48 hours after the manner of Example 1, followed by the same treatment as in Example 1 to obtain 79.0 g of white powder (conversion: 89.9%).

The results of elemental analysis, IR spectroscopic analysis and $^1$H-NMR analysis confirmed this polymer to be poly(N-cyclohexylallylamine hydrochloride).

Figure 3:
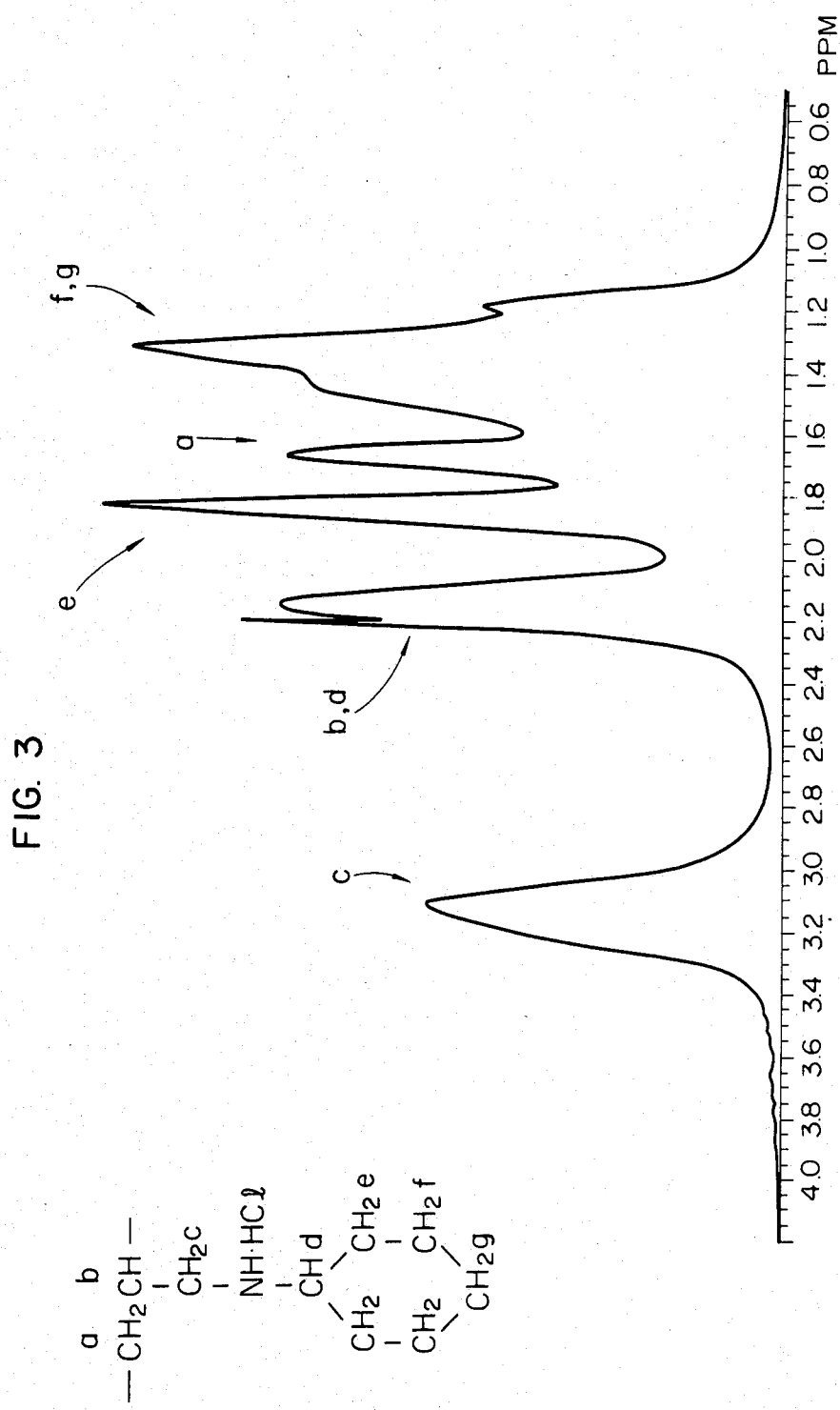
Figure 4:
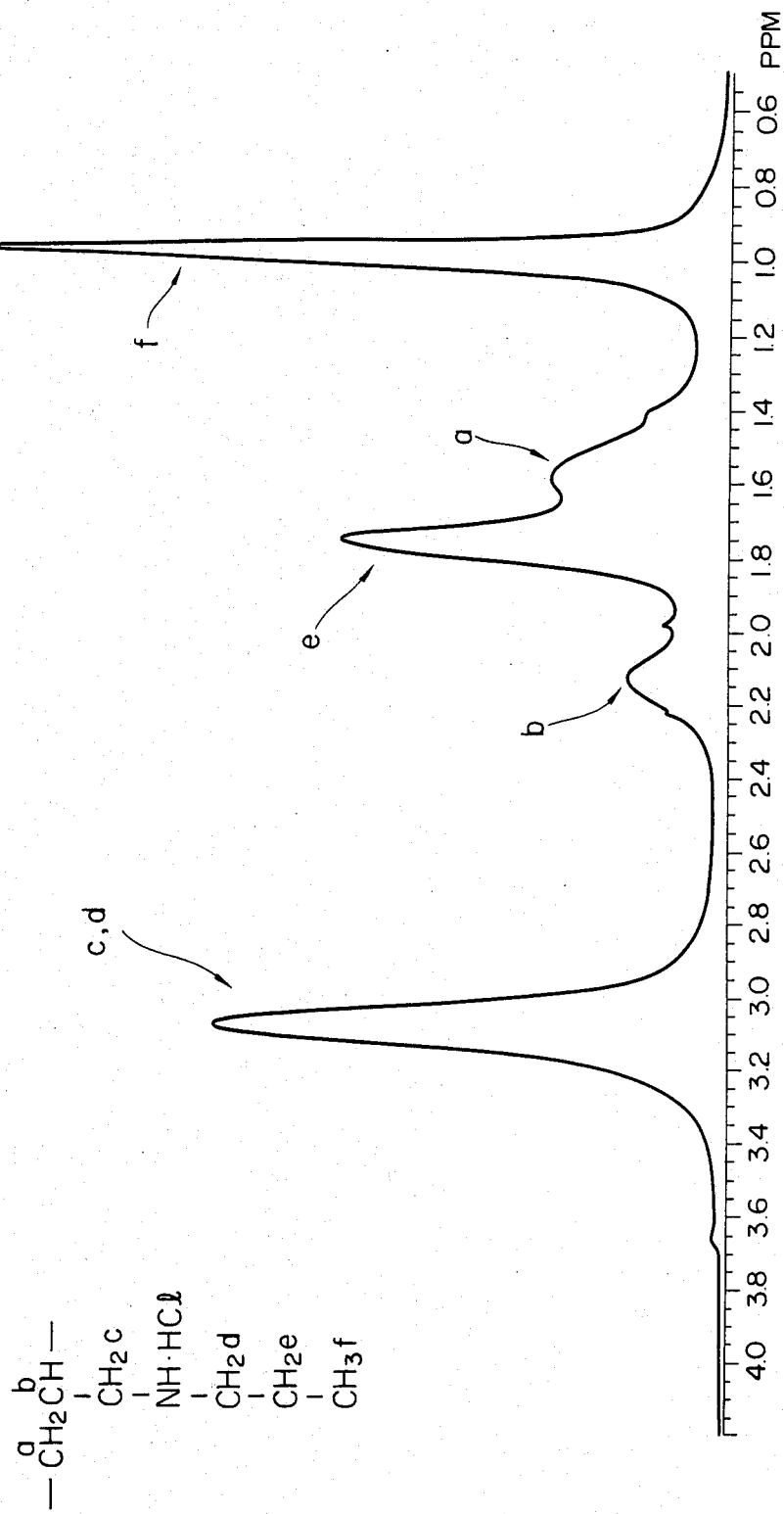
Figure 5:
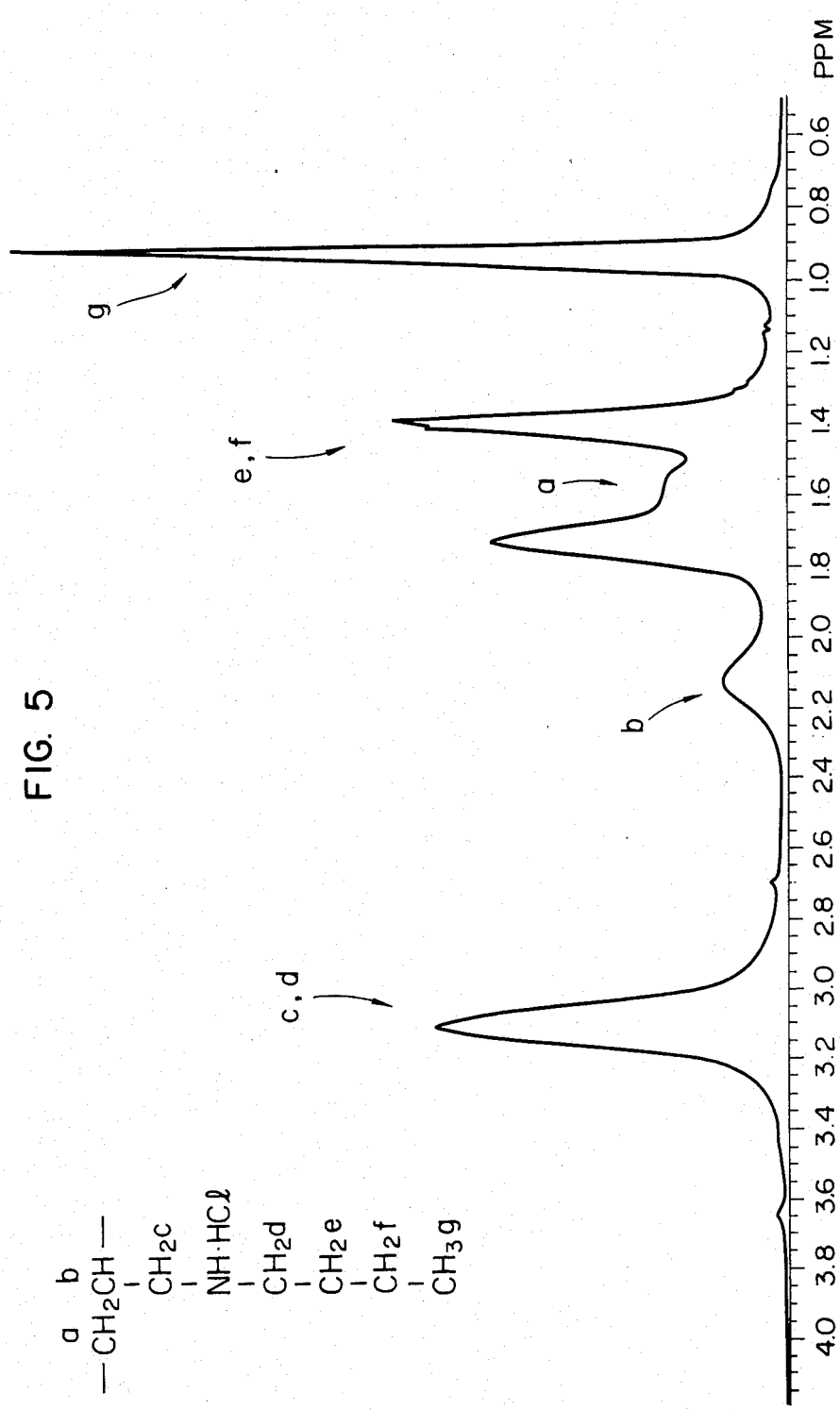
Figure 6:
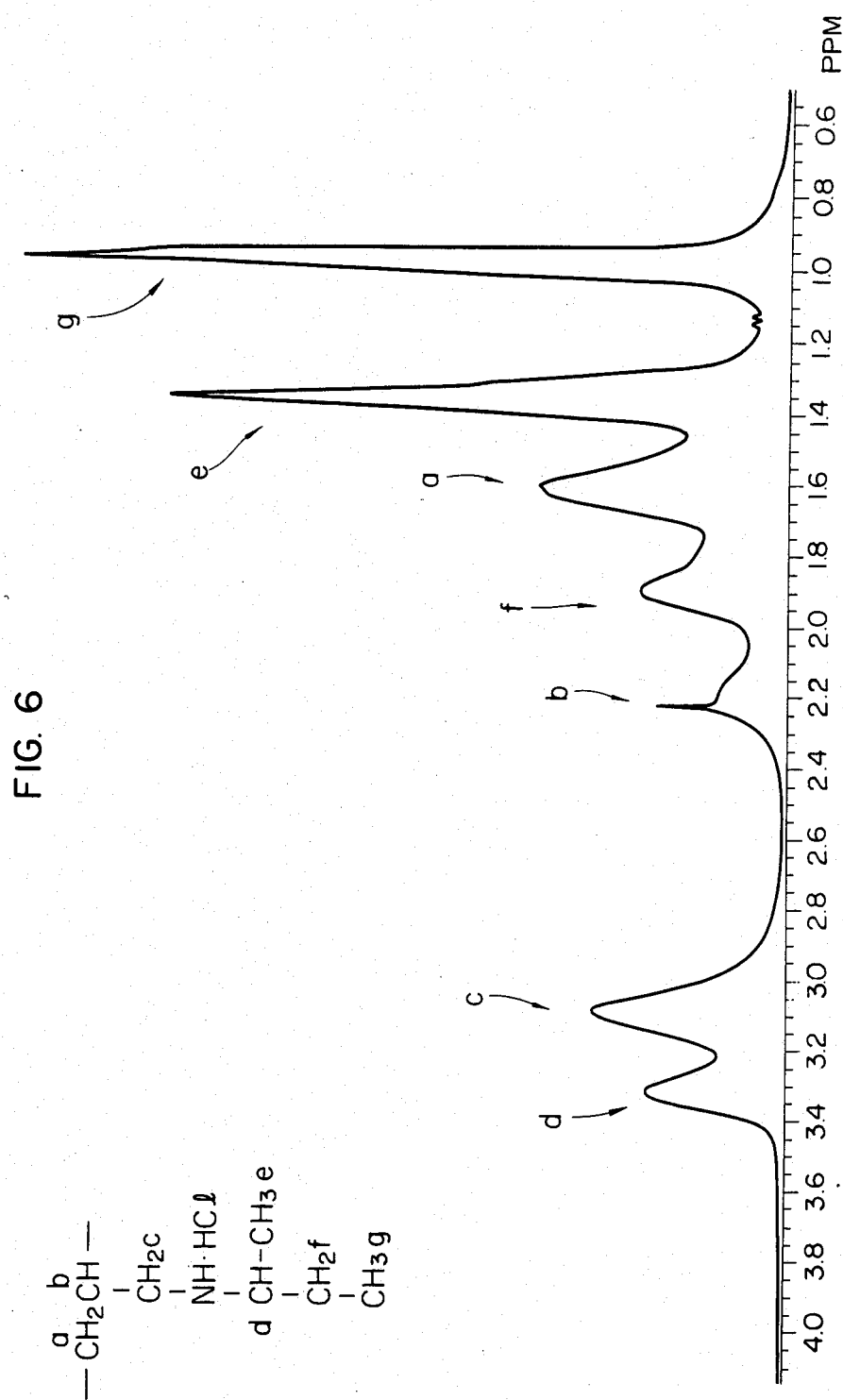
Figure 7:
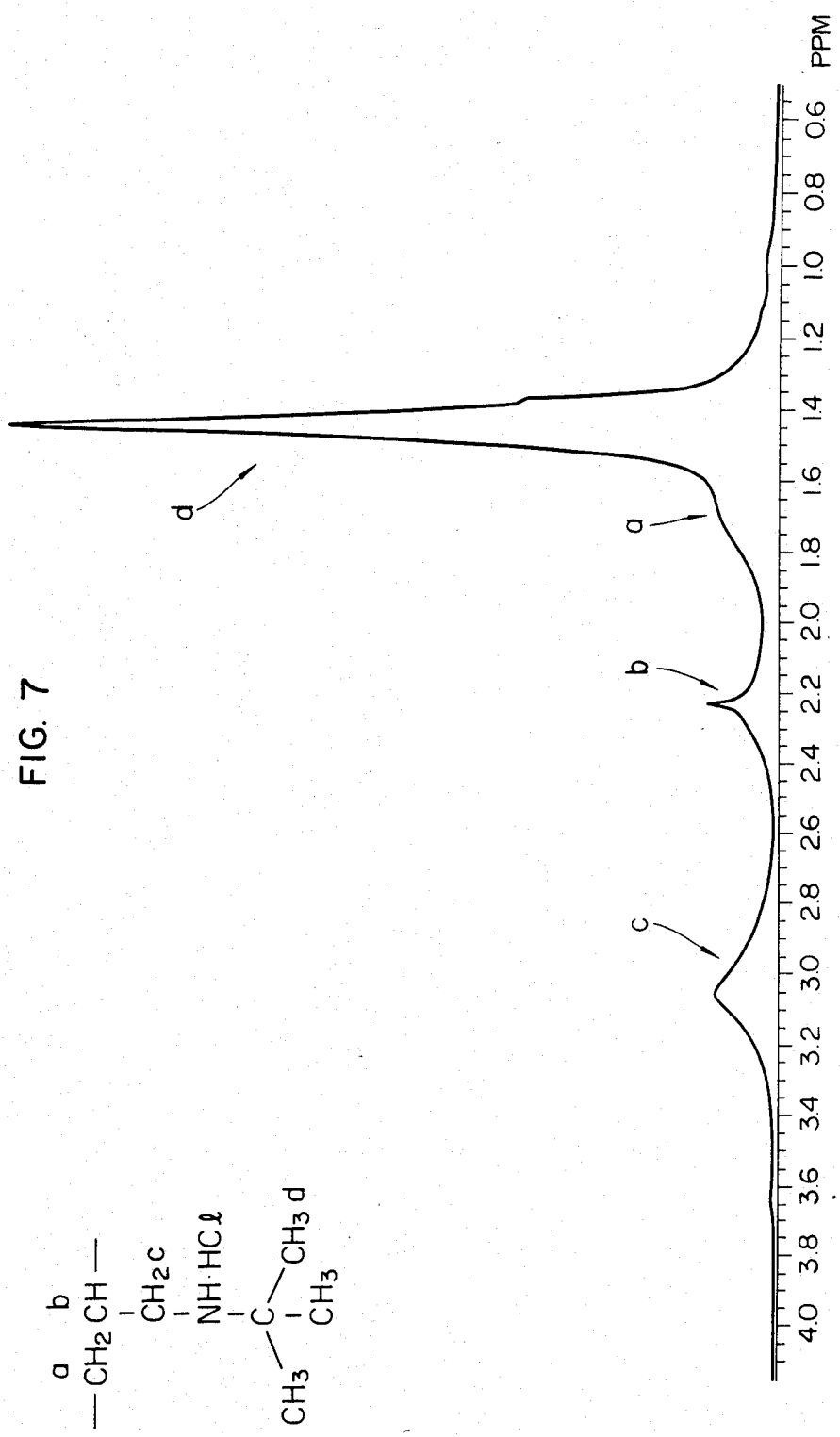
Figure 8:
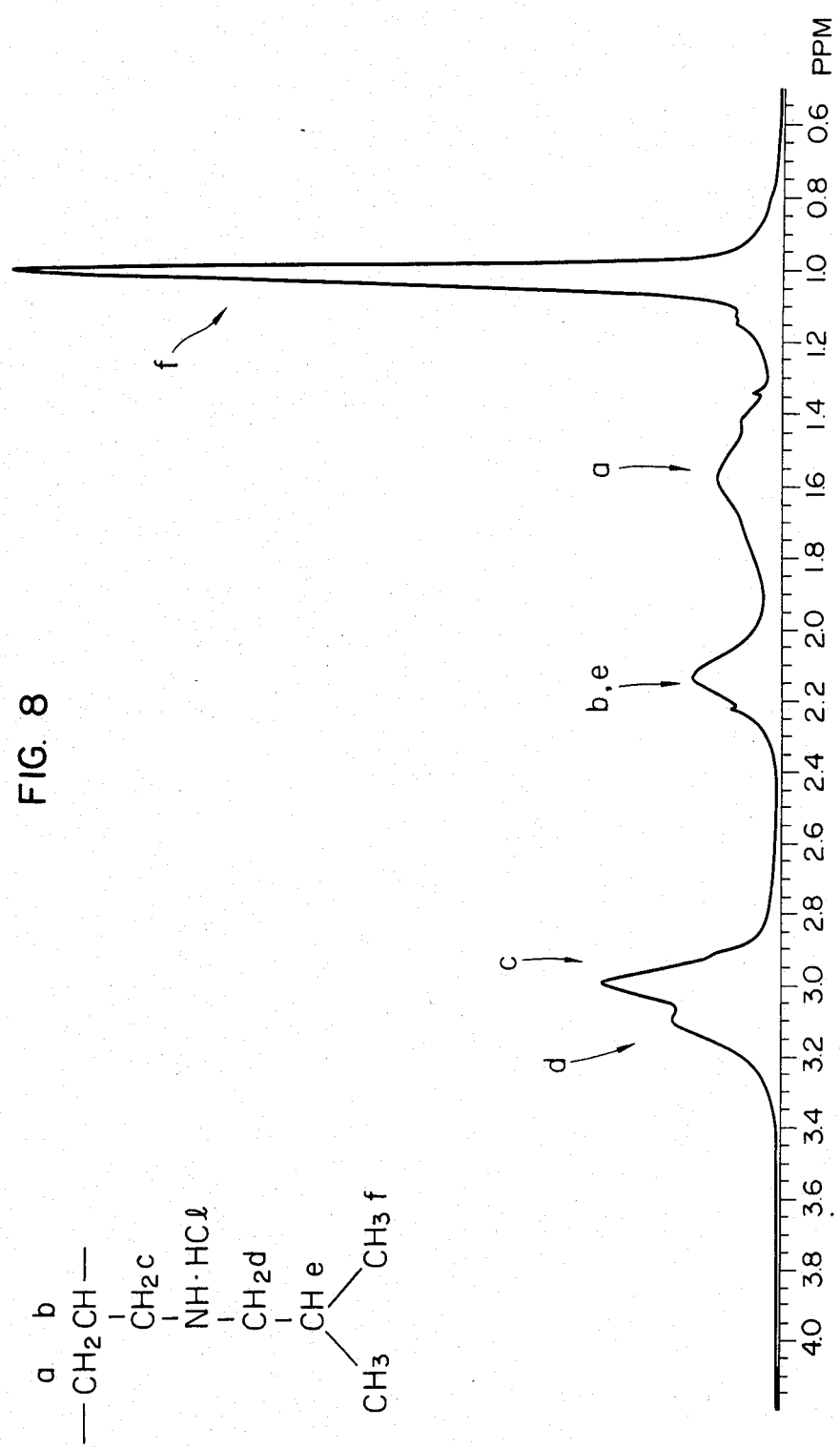

$^1$H-NMR spectrum of this polymer (in heavy water, 300 MHz, TSP internal standard) is shown in FIG. 3. Intrinsic viscosity of this polymer as measured in 1/10 mol NaCl solution at 30° C. was 0.18.

EXAMPLES 4-10

0.5 mol (1 mol in the case of ADP) of hydrochloric acid was added to 0.5 mol of each of the following amines: N-methylallylamine (abbreviated as MAA), N-n-propylallylamine (nPAA), N-n-butylallylamine (nBAA), N-sec-butylallylamine (sBAA), N-tert-butylallylamine (tBAA), N-iso-butylallylamine (iBAA) and N-allyl-N',N'-dimethylpropanediamine (ADP) in the same way as in Example 1 to prepare the aqueous solutions of the corresponding hydrochlorides, and they were polymerized by using initiator 1 under the same conditions as in Example 1. Polymerization conditions, conversion and intrinsic viscosity of the obtained polymers are shown collectively in Table 1.

TABLE 1

| Example | Monomer | Monomer concentration | Amount of initiator | Temperature | Time | Conversion | Intrinsic viscosity |
|---|---|---|---|---|---|---|---|
| 4 | MAA.HCl | 61.4% | 2.69 g | 60° C. | 48 hr. | 74.5% | 0.082 |
| 5 | nPAA.HCl | 66.7% | 2.71 g | " | " | 73.2% | 0.13 |
| 6 | nBAA.HCl | 68.9% | 4.49 g | " | " | 73.5% | 0.12 |
| 7 | sBAA.HCl | 68.9% | 2.25 g | " | " | 80.7% | 0.20 |
| 8 | tBAA.HCl | 65.0% | 2.99 g | " | " | 87.6% | 0.17 |
| 9 | iBAA.HCl | 68.9% | 3.74 g | " | " | 66.5% | 0.20 |
| 10 | ADP.2HCl | 61.4% | 4.38 g | " | " | 79.6% | 0.15 |

$^1$H-NMR spectra of the polymers obtained from nPAA-HCl, nBAA-HCl, s-BAA-HCl, t-BAA-HCl and i-BAA-HCl are shown in FIGS. 4, 5, 6, 7 and 8, respectively. As seen from these spectral manifestations, these polymers were identified to be poly(N-n-propylallylamine hydrochloride), poly(N-n-butylallylamine hydrochloride), poly(N-sec-butylallylamine hydrochloride), poly(N-tert-butylallylamine hydrochloride) and poly(N-iso-butylallylamine hydrochloride), respectively.

EXAMPLES 11-18

101.7 g of a 66.7% aqueous solution of N-isopropylallylamine hydrochloride was prepared in the same way as Example 2. To this solution were added, in place of initiator 1 in Example 2, 2,2'-azobis(2-(N-phenylamidino)propane) dihydrochloride (hereinafter referred to as initiator 2), 2,2'-azobis(2-(imidazolinyl)propane) dihydrochloride (initiator 3), 2,2'-azobis(2-(N-hydroxyethyl)amidinopropane) dihydrochloride (initiator 4), 2,2'-azobis(2-(N-dimethylaminopropylamidino)propane) tetrahydrochloride (initiator 5), 2,2'-azobis(2-methylpropionehydroxamic acid) (initiator 6), 2,2'-azobis(2-carboxyethylpropionehydroxamic acid) (initiator 7), 2,2'-azobis(2-methylpropaneamidoxime) (initiator 8), and 2,2'-azobis(2-methylpropionic acid hydrazide) (initiator 9) as polymerization initiator respectively to carry out the polymerization under the same conditions as in Example 2. The polymerization conditions and the results are shown in Table 2.

TABLE 2

| Example | Initiator | Temp. | Time | Conversion | Intrinsic viscosity |
|---|---|---|---|---|---|
| 11 | Initiator-2, 1.36 g | 60° C. | 48 hr. | 94.7% | 0.24 |
| 12 | Initiator-3, 1.36 g | " | " | 90.1% | 0.21 |
| 13 | Initiator-4, 1.36 g | " | " | 93.6% | 0.18 |
| 14 | Initiator-5, 1.36 g | " | " | 94.2% | 0.25 |
| 15 | Initiator-6, 1.36 g | " | " | 85.2% | 0.24 |
| 16 | Initiator-7, 1.36 g | " | " | 80.5% | 0.20 |
| 17 | Initiator-8, 1.36 g | " | " | 75.8% | 0.22 |
| 18 | Initiator-9, 1.36 g | " | " | 78.2% | 0.24 |

EXAMPLES 19-26

135.2 g of a 65.0% aqueous solution of N-cyclohexylallylamine hydrochloride was prepared by the same method as used in Example 3.

This solution was polymerized under the same conditions as in Example 3 by using the initiators 2-9 used in Examples 11-18, respectively, in place of initiator 1 in Example 3. The polymerization conditions and the results are shown in Table 3.

TABLE 3

| Example | Initiator | Temp. | Time | Conversion | Intrinsic viscosity |
|---|---|---|---|---|---|
| 19 | Initiator-2, 2.64 g | 60° C. | 48 hr. | 87.6% | 0.21 |
| 20 | Initiator-3, 2.64 g | " | " | 90.3% | 0.16 |
| 21 | Initiator-4, 2.64 g | " | " | 85.1% | 0.21 |
| 22 | Initiator-5, 2.64 g | " | " | 85.4% | 0.19 |
| 23 | Initiator-6, 2.64 g | " | " | 82.4% | 0.22 |
| 24 | Initiator-7, 2.64 g | " | " | 80.8% | 0.22 |
| 25 | Initiator-8, 2.64 g | " | " | 73.2% | 0.18 |
| 26 | Initiator-9, 2.64 g | " | " | 75.4% | 0.23 |

EXAMPLES 27-35

57.64 g (0.5 mol) of 85% phosphoric acid was added dropwise to 0.5 mol of each of the following amines: N-methylallylamine (MAA), N-ethylallylamine (EAA), N-n-propylallylamine (nPAA), N-iso-propylallylamine (iPAA), N-n-butylallylamine (nBAA), N-sec-butylallylamine (sBAA), N-tert-butylallylamine (tBAA), N-iso-butylallylamine (iBAA) and N-cyclohexylallylamine (CHAA) under cooling to maintain the temperature below 20° C., followed by the addition of water to prepare a 70% aqueous solution of phosphate of each of said amines. Each of the thus prepared solutions was polymerized under the same conditions as in Example 1 by using initiator 1. The viscosity of the solution increased gradually, and a viscous solution was obtained. When this solution was added into a large quantity of acetone, a white polymer precipitate was obtained. This precipitate was filtered out and dried at 50° C. under reduced pressure.

The polymerization conditions and the results are shown collectively in Table 4.

TABLE 4

| Example | Monomer | Monomer concentration | Amount of initiator | Temp. | Time | Conversion | Intrinsic viscosity |
|---|---|---|---|---|---|---|---|
| 27 | MAA.H$_3$PO$_4$ | 70% | 2.54 g | 60° C. | 48 hr. | 77.9% | 0.11 |
| 28 | EAA.H$_3$PO$_4$ | " | 2.75 g | " | " | 80.6% | 0.10 |
| 29 | nPAA.H$_3$PO$_4$ | " | 2.96 g | " | " | 81.9% | 0.17 |
| 30 | iPAA.H$_3$PO$_4$ | " | 2.96 g | " | " | 88.2% | 0.20 |
| 31 | nBAA.H$_3$PO$_4$ | " | 3.17 g | " | " | 80.4% | 0.16 |
| 32 | sBAA.H$_3$PO$_4$ | " | 3.17 g | " | " | 80.6% | 0.08 |
| 33 | tBAA.H$_3$PO$_4$ | " | 3.17 g | " | " | 82.7% | 0.11 |
| 34 | iBAA.H$_3$PO$_4$ | " | 3.17 g | " | " | 81.0% | 0.11 |
| 35 | CHAA.H$_3$PO$_4$ | " | 3.56 g | " | " | 81.8% | 0.12 |

EXAMPLE 36

25 g of poly(N-ethylallylamine hydrochloride) synthesized in Example 1 was dissolved in 225 g of distilled water to prepare a 10% aqueous solution of polymer. This aqueous solution was passed twice through an ion exchange column packed with 500 ml of Amberlite IRA 402 (produced by Organo Co., Ltd.) and then freeze dried to obtain 14.1 g of poly(N-ethylallylamine).

EXAMPLE 37

0.2 mol of each of poly(N-isopropylallylamine hydrochloride), poly(N-cyclohexylallylamine hydrochloride), poly(N-n-propylallylamine hydrochloride), poly(N-n-butylallylamine hydrochloride), poly(N-sec-butylallylamine hydrochloride), poly(N-tert-butylallylamine hydrochloride) and poly(N-iso-butylallylamine hydrochloride) synthesized in Examples 2–9, respectively, was dissolved in 80 g of methanol, followed by the addition thereto of a solution of 11.2 g of potassium hydroxide in 40 g of methanol. After removing potassium chloride which separated out by filtration, each solution was added to a large quantity of benzene to form a precipitate and this precipitate was dried to obtain 19.5 g of poly(N-iso-propylallylamine), 26.8 g of poly(N-cyclohexylallylamine), 18.7 g of poly(N-n-propylallylamine), 22.7 g of poly(N-n-butylallylamine), 21.4 g of poly(N-sec-butylallylamine), 21.6 g of poly(N-tert-butylallylamine), and 22.5 g of poly(N-iso-butylallylamine), respectively.

COMPARATIVE EXAMPLES

Polymerization treatments for N-ethylallylamine hydrochloride, N-isopropylallylamine hydrochloride and N-cyclohexylallylamine hydrochloride were carried out by using radical initiators other than those of this invention.

These polymerization treatments and the separation and purification of the produced polymers were conducted in the same way as described in the Examples given above.

The results are shown in Table 5, in which the following abbreviations are used:
AIBN: azobisisobutyronitrile
APS: ammonium persulfate
t-BHP: tert-butylhydroxy peroxide
CHP: cumene hydroperoxide
DMSO: dimethyl sulfoxide
EAA.HCl: N-ethylallylamine hydrochloride
iPAA.HCl: N-iso-propylallylamine hydrochloride
CHAA.HCl: N-cyclohexylallylamine hydrochloride

TABLE 5

| Comp. Example | Monomer | Solvent | Catalyst | Polymerization Temp. | Polymerization time | Conversion |
|---|---|---|---|---|---|---|
| 1 | EAA.HCl, 10 g | DMSO, 6 g | AIBN, 0.40 g | 60° C. | 48 hr. | <1% |
| 2 | " | Water, 6 g | APS, 0.40 g | " | " | <1% |
| 3 | " | Water, 6 g | tBHP, 0.40 g | " | " | <1% |
| 4 | " | DMSO, 6 g | CHP, 0.40 g | " | " | <1% |
| 5 | iPAA.HCl, 10 g | DMSO, 6 g | AIBN, 0.40 g | " | " | <1% |
| 6 | " | Water, 6 g | APS, 0.40 g | " | " | <1% |
| 7 | " | Water, 6 g | tBHP, 0.40 g | " | " | <1% |
| 8 | " | DMSO, 6 g | CHP, 0.40 g | " | " | <1% |
| 9 | CHAA.HCl, 10 g | DMSO, 6 g | AIBN, 0.40 g | " | " | <1% |
| 10 | " | Water, 6 g | APS, 0.40 g | " | " | <1% |
| 11 | " | Water, 6 g | tBHP, 0.40 g | " | " | <1% |
| 12 | " | DMSO, 6 g | CHP, 0.40 g | " | " | <1% |

What is claimed is:

1. Polymers of N-substituted secondary monoallylamines and their salts represented by the general formula:

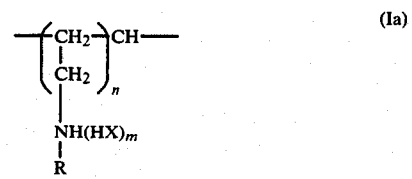

(Ia)

wherein R represents a radical selected from the group consisting of alkyl having 2 or more carbon atoms, substituted alkyl and cycloalkyl radicals; X represents a monovalent anionic radical; n represents an integer from 10 to 100,000; and m represents an integer from 0 to 100,000.

2. The polymers of claim 1 wherein R is selected from the group consisting of ethyl, n-propyl, iso-propyl, n-butyl, sec-butyl, iso-butyl, tert-butyl, amyl, hexyl, octyl, cyclohexyl, benzyl, 2-hydroxyethyl, 2-hydroxypropyl, 2-aminoethyl, N,N-dimethylaminopropyl and tris(hydroxymethyl)methyl radicals.

3. The polymers of claim 1 wherein X is selected from the group consisting of Cl, Br, I, HSO$_4$, HSO$_3$, H$_2$PO$_4$, H$_2$ 3, HCOO, CH₃COO and C₂H₅COO.

4. A process for producing polymers of N-substituted secondary monoallylamines and their salts represented by the general formula:

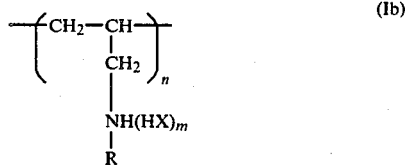 (Ib)

wherein R represents a radical selected from the group consisting of alkyl having one or more carbon atoms, substituted alkyl and cycloalkyl radicals; X represents a monovalent anionic radical; n represents an integer from 10 to 100,000; and m represents an integer from 0 to 100,000
which comprises polymerizing an N-substituted secondary monoallylamine salt represented by the general formula:

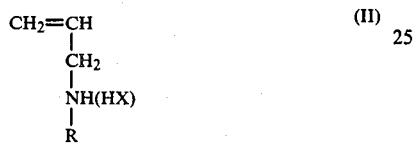 (II)

wherein R represents a radical selected from the group consisting of alkyl having one or more carbon atoms, substituted alkyl and cycloalkyl radicals; and X represents a monovalent anionic radical
in a polar solvent in the presence of a water-soluble radical initiator containing azo group in the molecule.

5. The process of claim 4, wherein the N-substituted secondary monoallylamine salt is an inorganic or organic acid salt of an amine selected from the group consisting of N-methylallylamine, N-ethylallylamine, N-n-propylallylamine, N-iso-propylallylamine, N-n-butylallylamine, N-sec-butylallylamine, N-tert-butylallylamine, N-iso-butylallylamine, N-amylallylamine, N-hexylallylamine, N-octylallylamine, N-cyclohexylallylamine, N-benzylallylamine, N-2-hydroxyethylallylamine, N-2-hydroxypropylallylamine, N-2-aminoethylallylamine, N-allyl-N,N-dimethyl-propanediamine and N-allylamino-tris(hydroxymethyl) methane.

6. The process of claim 4, wherein the water-soluble radical initiator containing azo group in the molecule is an azo compound represented by the general formula:

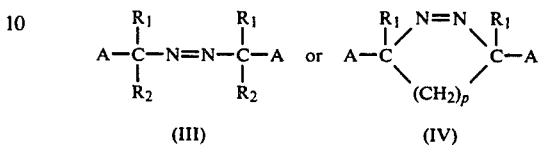

(III)              (IV)

wherein p is 1 or 2; R₁ and R₂, which may be the same or different, represent hydrogen or a hydrocarbon radical having 1 to 10 carbon atoms or substituted hydrocarbon radical, and R₁ and R₂ may be combined together to form a ring; and A represents

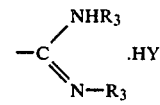

where R₃ represents a hydrocarbon radical having 1 to 8 carbon atoms or substituted hydrocarbon radical, and HY represents an inorganic or organic salt,

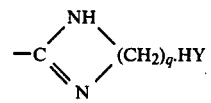

where HY is as defined above, and q is 2 to 3,

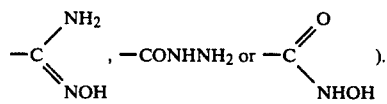

* * * * *